(12) United States Patent
Takahashi et al.

(10) Patent No.: US 7,437,940 B2
(45) Date of Patent: Oct. 21, 2008

(54) APPARATUS FOR MEASURING DIFFERENTIAL PRESSURE

(75) Inventors: Yuuichirou Takahashi, Tokyo (JP); Etsutarou Koyama, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 11/703,202

(22) Filed: Feb. 7, 2007

(65) Prior Publication Data

US 2007/0209442 A1      Sep. 13, 2007

(30) Foreign Application Priority Data

Mar. 13, 2006    (JP) .............................. 2006-067470

(51) Int. Cl.
*G01L 13/02*    (2006.01)
(52) U.S. Cl. .......................................... 73/716; 73/736
(58) Field of Classification Search .................. 73/716, 73/736
See application file for complete search history.

(56) References Cited

U.S. PATENT DOCUMENTS 5,870,695 A * 2/1999 Brown et al. ................ 702/138

OTHER PUBLICATIONS

"The Bible of Field Instrument", Apr. 17, 2001, pp. 62, 63 and unnumbered, Publisher: Kogyo Gigyutu-Sha.

* cited by examiner

*Primary Examiner*—Andre J Allen
(74) *Attorney, Agent, or Firm*—Sughrue Mion, PLLC (57) ABSTRACT

An apparatus for measuring differential pressure includes first and second sensor units. The first sensor unit detects directly a first pressure of a substance at a first position and acquires a first detection result that indicates the first pressure. The second sensor unit detects directly a second pressure of the substance at a second position different from the first position. The second sensor unit acquires a second detection result that indicates the second pressure and receives the first detection result from the first sensor unit. The second sensor unit calculates a differential pressure between the first and second positions with reference to the first and second detection results.

10 Claims, 6 Drawing Sheets

APPARATUS FOR MEASURING DIFFERENTIAL PRESSURE

BACKGROUND OF THE INVENTION

1. Field of the Invention

The present invention generally relates to an apparatus for measuring differential pressure between different regions, sites or positions of a tube through which a substance such as a light can flow.

Priority is claimed on Japanese Patent Application No. 2006-67470, filed Mar. 13, 2006, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Some examples of the conventional differential pressure measuring apparatus have been known. The conventional differential pressure measuring apparatus is configured to measure a differential pressure between the opposite sides of an orifice plate that is disposed in a tube through which a liquid can flow. A first example of the conventional differential pressure measuring apparatuses uses connecting tubes that are connected with the tube on the opposite sides of an orifice plate. The connecting tubes are configured to draw the liquid from the opposite sides of the orifice plate into the connecting tubes so that the pressures of the liquid on the opposite sides of the orifice plate travel through the connecting tubes.

Further, the connecting tubes are connected to each other through a three-valve. The pressures of the liquid on the opposite sides of the orifice plate travel through the connecting tubes and reach the three-valve at which detectors are provided. The traveled liquid pressures are then detected by the detectors. The detected pressures are then compared to each other to measure a differential pressure of the liquid between the opposite sides of the orifice plate, based on the detected pressures.

A second example of the conventional differential pressure measuring apparatus uses capillary tubes that are connected with a tube on the opposite sides of an orifice plate that is disposed in the tube through which a liquid can flow. The capillary tubes are filled with a sealed liquid such as silicone oil. The capillary tubes are not designed to allow a continuing flow of liquid. The liquid that is sealed in the capillary tube may act as a pressure-traveling medium that causes the liquid pressure to travel through it. The traveled pressures of the sealed liquid are then detected to measure a differential pressure between the opposite sides of the orifice plate, based on the detected pressures.

As described above, the first example of the conventional differential pressure measuring apparatus is configured to draw a liquid from the tube into the connecting tubes. The connecting tubes are narrower than the tube. If the liquid contains a solid material or has a high viscosity, then the liquid may flow through the tube while causing a clog of a liquid flow in the connecting tube. In other cases, the connecting tubes may be corroded or broken to cause a leakage of the liquid from them.

As described above, the second example of the conventional differential pressure measuring apparatus uses the capillary tubes that are filled with a sealed liquid. The capillary tube is a very narrow tube. The liquid that is sealed in the capillary tube may have an increased viscosity at a decreased ambient temperature. The increased viscosity provides an increased viscous resistance that inhibits the liquid pressure to travel through the capillary tube. This may deteriorate the sensitivity of the differential pressure measuring apparatus.

In other cases, the capillary tube may have a temperature difference over positions thereof In other words, a local area of the capillary tube may be different in temperature from the remaining portion thereof This temperature difference may cause the sealed liquid to exhibit a local thermal expansion at the different-temperature portion of the capillary. The local thermal expansion causes a local volumetric change of the sealed liquid. The local volumetric change may disturb the pressure of the sealed liquid from traveling through the capillary tube. As a result, the traveled pressure is different from the original pressure. The temperature difference or variation over the capillary tube may deteriorate the sensitivity of the differential pressure measuring apparatus.

In view of the above, it will be apparent to those skilled in the art from this disclosure that there exists a need for an improved apparatus and/or method. This invention addresses this need in the art as well as other needs, which will become apparent to those skilled in the art from this disclosure.

SUMMARY OF THE INVENTION

Accordingly, it is a primary object of the present invention to provide an apparatus for measuring differential pressure.

It is another object of the present invention to provide an apparatus for measuring differential pressure at a high accuracy.

It is a further object of the present invention to provide an apparatus measuring differential pressure at an improved reliability.

In accordance with a first aspect of the present invention, an apparatus for measuring differential pressure may include, but is not limited to, first and second sensor units. The first sensor unit may be configured to detect directly a first pressure of a substance at a first position. The first sensor unit may be configured to acquire a first detection result that indicates the first pressure. The second sensor unit may be configured to detect directly a second pressure of the substance at a second position. The second position is different from the first position. The second sensor unit may be configured to acquire a second detection result that indicates the second pressure. The second sensor unit may be configured to receive the first detection result from the first sensor unit. The second sensor unit may be configured to calculate a differential pressure between the first and second positions with reference to the first and second detection results.

In accordance with a second aspect of the present invention, an apparatus for measuring differential pressure may include, but is not limited to, first and second sensor units. The first sensor unit may be configured to detect directly a first pressure of a substance at a first position. The first sensor unit may be configured to acquire a first detection result that indicates the first pressure. The second sensor unit may be configured to detect directly a second pressure of the substance at a second position, the second position being different from the first position. The second sensor unit may be configured to acquire a second detection result that indicates the second pressure. The calculation unit may be configured to receive the first detection result from the first sensor unit. The calculation unit may be configured to calculate a differential pressure between the first and second positions with reference to the first and second detection results.

These and other objects, features, aspects, and advantages of the present invention will become apparent to those skilled in the art from the following detailed descriptions taken in conjunction with the accompanying drawings, illustrating the embodiments of the present invention.

BRIEF DESCRIPTION OF THE DRAWINGS

Referring now to the attached drawings which form a part of this original disclosure.

DETAILED DESCRIPTION OF THE INVENTION

In accordance with a first aspect of the present invention, an apparatus for measuring differential pressure may include, but is not limited to, first and second sensor units. The first sensor unit may be configured to detect directly a first pressure of a substance at a first position. The first sensor unit may be configured to acquire a first detection result that indicates the first pressure. The second sensor unit may be configured to detect directly a second pressure of the substance at a second position. The second position is different from the first position. The second sensor unit may be configured to acquire a second detection result that indicates the second pressure. The second sensor unit may be configured to receive the first detection result from the first sensor unit. The second sensor unit may be configured to calculate a differential pressure between the first and second positions with reference to the first and second detection results.

The first and second sensor units may be configured to directly detect the first and second pressures of the substance at the first and second positions different from each other. In some cases, the first and second sensor units may be disposed in or adjacent to the substance to directly detect the first and second pressures of the substance. The differential pressure measuring apparatus does not need any connecting tubes that introduce the substance such as a liquid to the first and second sensor units.

The differential pressure measuring apparatus does not utilize any connecting tubes which introduce the substance such as a liquid into the first and second sensor units. Therefore, the differential pressure measuring apparatus is free from the problem with the clogged flow of the substance such as a liquid in the connecting tubes. The differential pressure measuring apparatus is also free from the problem with the leakage of the substance such as a liquid due to corrosion or failure of the connecting tubes.

The differential pressure measuring apparatus does not utilize capillary tubes which introduce the substance of a liquid into the first and second sensor units. Therefore, the differential pressure measuring apparatus is free from the problem with deterioration of the sensitivity due to an increased viscous resistance of the sealed liquid in the capillary tubes. Further, the differential pressure measuring apparatus is free from the problem with deterioration of the measuring accuracy due to local volumetric variations of the liquid in the capillary tubes.

The second sensor unit performs a plurality of separate functions of detecting the second pressure and calculating the differential pressure. This integrated configuration reduces the number of necessary elements or parts that constitute the differential pressure measuring apparatus. It is unnecessary to provide plural discrete parts or components for performing the plural functions. This configuration may contribute to scaling down and cost-reduction of the differential pressure measuring apparatus.

The first and second sensor units may be operatively coupled to each other to acquire the first and second detection results synchronously with each other. These synchronized acquisition operations may improve the accuracy in detecting the differential pressure. In some cases, the second sensor unit may be configured to generate a synchronizing signal and transmit the synchronizing signal to the first sensor unit, so that the first and second sensor units acquire the first and second detection results synchronously with each other based on the synchronizing signal. In other cases, the first and second sensor units may respectively include first and second timers that operate synchronously with each other and allow the first and second sensor units to acquire the first and second detection results synchronously with each other.

The differential pressure measuring apparatus may further include a temperature sensor unit. The temperature sensor unit may be configured to detect the temperature of the substance at least one of the first and second positions. The temperature sensor unit may be configured to acquire a third detection result that indicates the temperature. The temperature sensor unit may be configured to transmit the third detection result to the second sensor unit. The temperature sensor unit may be operatively coupled to the first and second sensor units to allow the first and second sensor units and the temperature sensor unit to acquire the first, second and third detection results synchronously with each other. These synchronous operations further allow the second sensor unit to calculate an accurate flow rate of the substance such as a liquid with reference to the calculated differential pressure, the detected temperature and the dependency of the density of the substance such as a liquid upon temperature.

In some cases, the first sensor unit may include, but is not limited to, a first pressure sensor and a first detection result acquiring unit. The first pressure sensor may be configured to detect the first pressure. The first detection result acquiring unit may be configured to acquire the first detection result. The second sensor unit may include, but is not limited to, a second pressure sensor, a second detection result acquiring unit, and a calculation unit. The second pressure sensor may be configured to detect the second pressure. The second detection result acquiring unit may be configured to acquire the second detection result. The calculation unit may be configured to receive the first and second detection results from the first and second detection result acquiring units. The calculation unit may be configured to calculate the differential pressure.

In some cases, the second detection result acquiring unit may be configured to generate the synchronizing signal and transmit the synchronizing signal to the first detection result acquiring unit, so that the first and second detection result acquiring units acquire the first and second detection results synchronously with each other based on the synchronizing signal.

The first and second detection result acquiring units may respectively include first and second timers that operate synchronously with each other and allow the first and second detection result acquiring units to acquire the first and second detection results synchronously with each other.

The differential pressure measuring apparatus may further include a temperature sensor and a temperature detection result acquiring unit. The temperature sensor may be configured to detect the temperature of the substance at least one of the first and second positions. The temperature sensor may be configured to acquire a third detection result that indicates the temperature. The temperature detection result acquiring unit may be configured to acquire the third detection result, the temperature detection result acquiring unit being configured to transmit the third detection result to the calculation unit. The temperature detection result acquiring unit may be operatively coupled to the first and second detection result acquiring units to allow the first and second detection result acquiring units and the temperature detection result acquiring unit to acquire the first, second and third detection results synchronously with each other.

In accordance with a second aspect of the present invention, an apparatus for measuring differential pressure may include, but is not limited to, first and second sensor units. The first sensor unit may be configured to detect directly a first pressure of a substance at a first position. The first sensor unit may be configured to acquire a first detection result that indicates the first pressure. The second sensor unit may be configured to detect directly a second pressure of the substance at a second position, the second position being different from the first position. The second sensor unit may be configured to acquire a second detection result that indicates the second pressure. The calculation unit may be configured to receive the first detection result from the first sensor unit. The calculation unit may be configured to calculate a differential pressure between the first and second positions with reference to the first and second detection results.

The differential pressure measuring apparatus does not utilize any connecting tubes which introduce the substance such as a liquid into the first and second sensor units. Therefore, the differential pressure measuring apparatus is free from the problem with the clogged flow of the substance such as a liquid in the connecting tubes. The differential pressure measuring apparatus is also free from the problem with the leakage of the substance such as a liquid due to corrosion or failure of the connecting tubes.

The differential pressure measuring apparatus does not utilize capillary tubes which introduce the substance of a liquid into the first and second sensor units. Therefore, the differential pressure measuring apparatus is free from the problem with deterioration of the sensitivity due to an increased viscous resistance of the sealed liquid in the capillary tubes. Further, the differential pressure measuring apparatus is free from the problem with deterioration of the measuring accuracy due to local volumetric variations of the liquid in the capillary tubes.

The calculation unit may be disposed separately from the first and second sensor units. This configuration may ensure an increased flexibility thereof.

Selected embodiments of the present invention will now be described with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
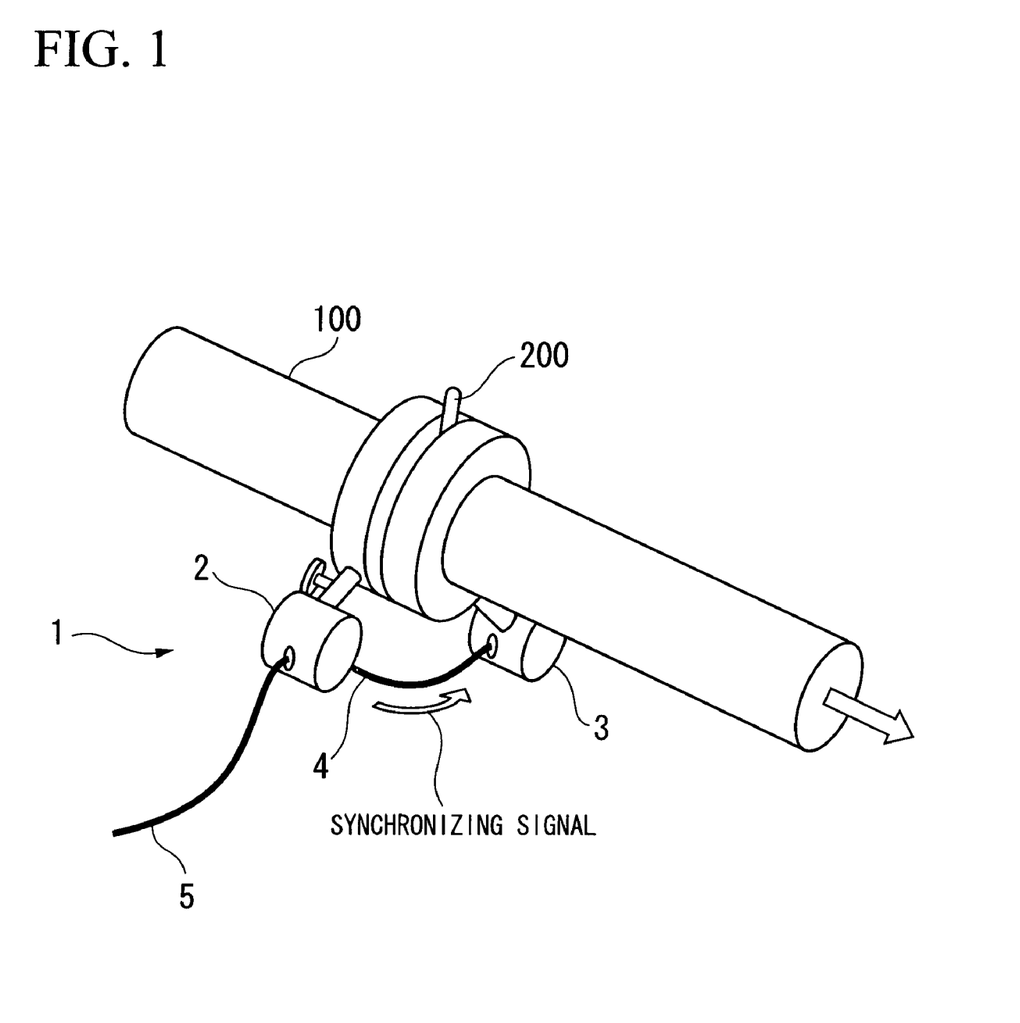
FIG. 1 is a schematic perspective view illustrating a differential pressure measuring apparatus in accordance with the first embodiment of the present invention.
Figure 2:
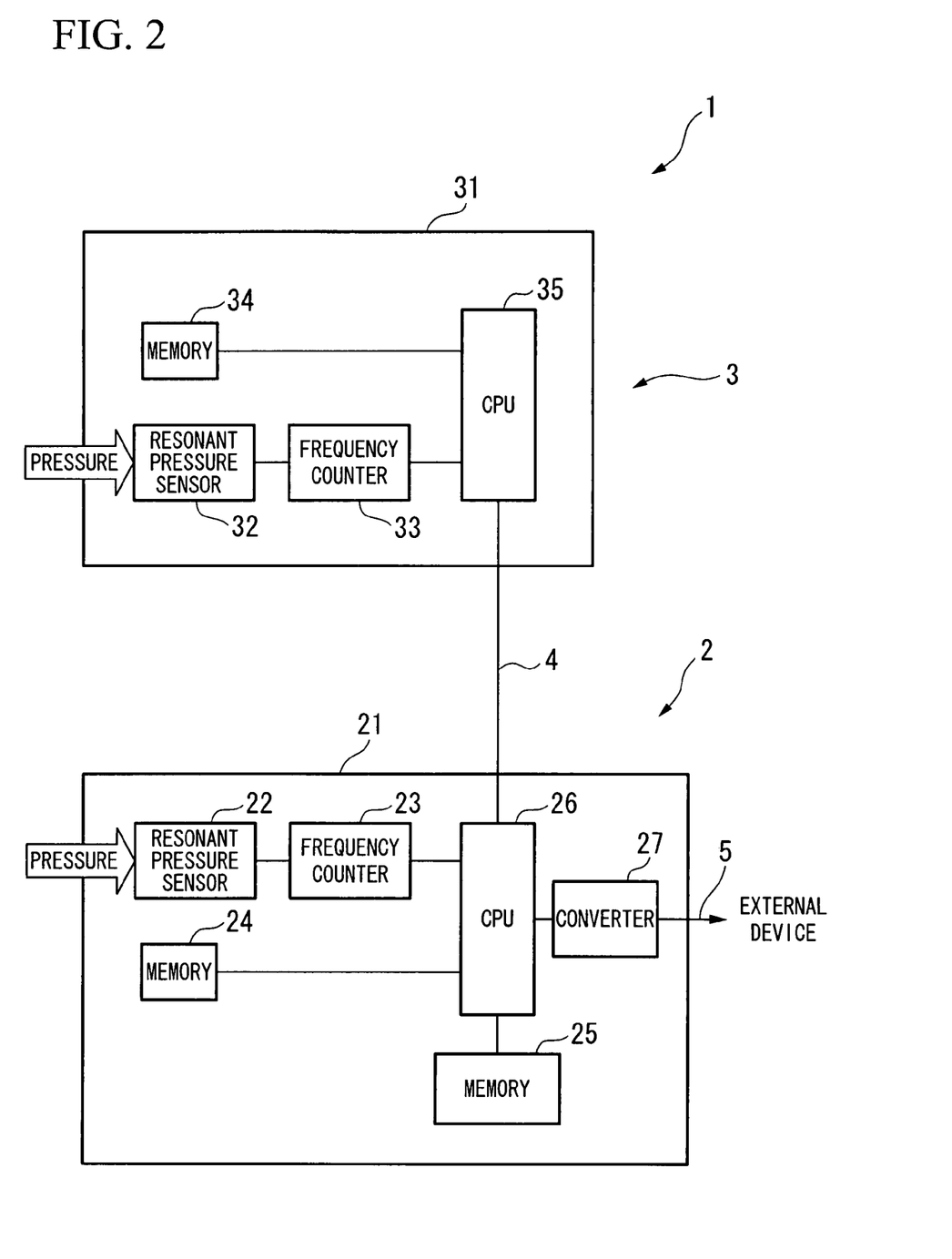
FIG. 2 is a block diagram illustrating functional blocks of the differential pressure measuring apparatus of FIG. 1.

A first embodiment of the present invention will be described. FIG. 1 is a schematic perspective view illustrating a differential pressure measuring apparatus in accordance with the first embodiment of the present invention. FIG. 2 is a block diagram illustrating functional blocks of the differential pressure measuring apparatus of FIG. 1.

As shown in FIG. 1, a differential pressure measuring apparatus 1 may be used to measure a differential pressure between different portions, areas or sites of a tube 100 that is configured to allow a continuing flow of liquid in a direction indicated by an arrow mark. An orifice plate 200 is disposed at a first site of the tube 100. The orifice plate 200 creates a pressure difference of a liquid between upstream and downstream thereof while the liquid flows through a hole of the orifice plate 200. The differential pressure measuring apparatus 1 may include, but is not limited to, first and second sensor units 2 and 3. The first and second sensor units 2 and 3 may be configured to be coupled to the tube 100 on the opposite sides of the orifice plate 200.

The first sensor unit 2 may be configured to be communicated with an upstream portion of the tube 100, wherein the upstream portion of the tube 100 is positioned upstream of the orifice plate 200. The second sensor unit 3 may be configured to be communicated with a downstream portion of the tube 100, wherein the downstream portion is positioned downstream of the orifice plate 200. The first sensor unit 2 may thus be configured to detect directly a pressure of a liquid in the tube 100 upstream of the orifice plate 200. The first sensor unit 2 may also be referred to as an upstream sensor unit 2. The pressure of the upstream portion may also be referred to as an upstream pressure. The second sensor unit 3 may thus be configured to detect directly another pressure of the liquid in the tube 100 downstream of the orifice plate 200. The second sensor unit 3 may also be referred to as a downstream sensor unit 3. The other pressure of the downstream portion may also be referred to as a downstream stream pressure.

The upstream sensor unit 2 may be configured to be electrically connected to an external device through a signal transmission line 5. The downstream sensor unit 3 may also be configured to be electrically connected to the upstream sensor unit 2 through a local data bus 4.

As shown in FIG. 2, the upstream sensor unit 2 may include, but is not limited to, a first enclosure 21, a first resonant pressure sensor 22, a first frequency counter 23, a first memory 24, a second memory 25, a first CPU 26, and a converter 27.

The downstream sensor unit 3 may include, but is not limited to, a second enclosure 31, a second resonant pressure sensor 32, a second frequency counter 33, a third memory 34, and a second CPU 35.

The first enclosure 21 may be configured to contain the first resonant pressure sensor 22, the first frequency counter 23, the first memory 24, the second memory 25, the first CPU 26, and the converter 27. The shape of the first enclosure 21 is optional, but may typically be a cylinder in general.

The first resonant pressure sensor 22 may be mechanically coupled to the upstream portion of the tube 100 so that the first resonant pressure sensor 22 receives and senses the upstream pressure of the upstream portion of the tube 100. The first resonant pressure sensor 22 may be configured to generate a first pulse signal having a frequency that indicates the sensed upstream pressure. The first resonant pressure sensor 22 may be realized by, but not limited to, a known resonant pressure sensor such as a silicon resonant pressure sensor. The silicon resonant pressure sensor has a diaphragm and a silicon resonator disposed on the diaphragm. The natural frequency of the resonator varies depending upon a pressure that is applied to the diaphragm.

The first frequency counter 23 may be configured to be electrically connected to the first resonant pressure sensor 22 so that the first frequency counter 23 receives the first pulse signal from the first resonant pressure sensor 22. The first frequency counter 23 may be configured to count the frequency of the first pulse signal and generate a first count value. The first count value indicates the upstream pressure detected by the first resonant pressure sensor 22.

The first memory 24 may be configured to be electrically connected to the first CPU 26. The first memory 24 may be configured to store information about characteristics of the first resonant pressure sensor 22. The characteristics of the first resonant pressure sensor 22 may include variation in frequency of the first pulse signal. The first pulse signal may vary in frequency depending on the external temperature and the characteristics of the diaphragm. The first memory 24 may be realized by, but not limited to, a non-volatile memory such as EEP-ROM, flash ROM, EP-ROM, or P-ROM.

The second memory 25 may be configured to be electrically connected to the first CPU 26. The second memory 25 may be configured to store software that is to be executed by the first CPU 26. The second memory 25 may be configured to store operation programs for calculating differential pressure. The second memory 25 may also be configured to store a set of given values such as output timing for synchronization signal. The second memory 25 may also be configured to store another set of given values for various range information and for filter time constant. The second memory 25 may be realized by, but not limited to, a non-volatile memory such as EEP-ROM. The second memory 25 may be realized by, but not limited to, an integrated ROM in the first CPU 26.

The first CPU 26 may be configured to be electrically connected to the first frequency counter 23 so that the first CPU 26 receives the first count value from the first frequency counter 23 at a predetermined timing. The first count value indicates the upstream pressure detected by the first resonant pressure sensor 22 that is included in the upstream sensor unit 2. The first CPU 26 may be configured to be electrically connected through the local data bus 4 to the second CPU 35 that is included in the downstream sensor unit 3 so that the first CPU 26 receives a second count value from the second CPU 35. The second count value indicates the downstream pressure detected by the second resonant pressure sensor 33 that is included in the downstream sensor unit 3.

The first CPU 26 may be configured to calculate the upstream and downstream pressures from the first and second count values, respectively. The first CPU 26 may also be configured to obtain the characteristics of the first and second resonant pressure sensors 22 and 32. The first CPU 26 may also be configured to correct the calculated upstream and downstream pressures with reference to the characteristics of the first and second resonant pressure sensors 22 and 32. The first CPU 26 may also be configured to calculate a difference between the corrected upstream and downstream pressures, thereby generating a differential pressure signal that indicates the calculated differential pressure.

As described above, the first CPU 26 may be coupled to the second CPU 35 through the local data bus 4. The first CPU 26 transmits a synchronizing signal to the second CPU 35 through the local data bus 4 so as to permit the first CPU 26 to receive the first and second count values from the first frequency counter 23 and the second CPU 35 synchronously.

The first CPU 26 may further be configured to execute control programs so as to control the differential pressure measuring apparatus 1.

The converter 27 may be configured to be electrically connected to the first CPU 26 so that the converter 27 receives the differential pressure signal from the first CPU 26. The converter 27 may also be coupled to the external device through the signal transmission line 5. The converter 27 may also be configured to convert the differential pressure signal into a converted differential pressure signal that is adaptive to the external device.

As described above, the downstream sensor unit 3 may include the second enclosure 31, the second resonant pressure sensor 32, the second frequency counter 33, the third memory 34, and the second CPU 35.

The second enclosure 31 may be configured to contain second resonant pressure sensor 32, the second frequency counter 33, the third memory 34, and the second CPU 35. The shape of the second enclosure 31 is optional, but may typically be a cylinder in general.

The second resonant pressure sensor 32 may be mechanically coupled to the downstream portion of the tube 100 so that the second resonant pressure sensor 32 receives and senses the downstream pressure of the downstream portion of the tube 100. The second resonant pressure sensor 32 may be configured to generate a second pulse signal having a frequency which indicates the sensed downstream pressure. The second resonant pressure sensor 32 may be realized by, but not limited to, a known resonant pressure sensor such as the above-described silicon resonant pressure sensor.

The second frequency counter 33 may be configured to be electrically connected to the second resonant pressure sensor 32 so that the second frequency counter 33 receives the second pulse signal from the second resonant pressure sensor 32. The second frequency counter 33 may be configured to count the frequency of the second pulse signal and generate the second count value. The second count value indicates the downstream pressure detected by the second resonant pressure sensor 32.

The third memory 34 may be configured to be electrically connected to the second CPU 35. The third memory 34 may be configured to store information about characteristics of the second resonant pressure sensor 32. The characteristics to be stored in the third memory 34 may include variation in frequency of the second pulse signal from the second resonant pressure sensor 32. The appearance of variation in frequency of the first pulse signal may depend on the external temperature and the characteristics of the diaphragm. The third memory 34 may be realized by, but not limited to, a non-volatile memory such as EEP-ROM, flash ROM, EP-ROM, or P-ROM.

As described above, the second CPU 35 may be electrically connected to the first CPU 26 through the local data bus 4 so that the second CPU 35 receives the synchronizing signal from the first CPU 26. Upon receipt of the input of the synchronizing signal, the second CPU 35 acquires the second count value from the second frequency counter 33 and transmits the second count value to the first CPU 26 through the local data bus 4. The first CPU 26 receives both the first and second count values from the first frequency counter 23 and the second CPU 35, synchronously. The first CPU 26 calculates the differential pressure from the first and second count values.

Operations of the differential pressure measuring apparatus 1 will be described. The liquid in the upstream portion of the tube 100 has the upstream pressure. The liquid in the downstream portion of the tube 100 has the downstream pressure.

The first resonant pressure sensor 22 receives the upstream pressure that has traveled from the upstream portion of the tube 100. The first resonant pressure sensor 22 generates the first pulse signal with a frequency that indicates the upstream pressure. The first pulse signal is then transmitted from the first resonant pressure sensor 22 to the first frequency counter 23. The first frequency counter 23 receives the first pulse signal from the first resonant pressure sensor 22 and counts the frequency of the first pulse signal, thereby generating the first count value that indicates the sensed upstream pressure.

The second resonant pressure sensor 32 receives the downstream pressure that has traveled from the downstream portion of the tube 100. The second resonant pressure sensor 32 generates the second pulse signal with a different frequency that indicates the downstream pressure. The second pulse signal is then transmitted from the second resonant pressure sensor 32 to the second frequency counter 33. The second frequency counter 33 receives the second pulse signal from the second resonant pressure sensor 32 and counts the frequency of the second pulse signal, thereby generating the second count value that indicates the sensed downstream pressure.

The first CPU 26 in the upstream sensor unit 2 transmits the synchronizing signal to the second CPU 35 through the local data bus 4 at the output timing that has been stored in the second memory 25.

The second CPU 35 in the downstream sensor unit 3 receives the synchronizing signal from the first CPU 26. Upon receipt of the synchronizing signal, the second CPU 35 acquires the second count value from the second frequency counter 33 and then transmits the second count value to the first CPU 26 through the local data bus 4.

The first CPU 26 acquires the first count value from the first frequency counter 23 while the first CPU 26 receives the second count value from the second CPU 35. In other words, the first CPU 26 acquires the first count value from the from the first frequency counter 23 after a time period has elapsed from when transmitting the synchronizing signal to the second CPU 35 through the local data bus 4. The time period is defined between first and second timings. At the first timing, the first CPU 26 transmits the synchronizing signal to the second CPU 35 through the local data bus 4. At the second timing, the first and second CPUs 26 and 35 acquire the first and second count values from the first and second frequency counters 23 and 33. This means that the upstream and downstream pressures at the same time are synchronously detected by the upstream and downstream sensor units 2 and 3.

The first CPU 26 performs the acquisition operation that is synchronized with the other acquisition operation performed by the second CPU 25. The above-describe time period may have previously been stored in the second memory 25. The synchronized acquisition operations ensure that the first and second count values accurately indicate the upstream and downstream pressures, provided that the upstream and downstream pressures have been detected synchronously by the first and second resonant pressure sensors 22 and 32. In other words, the synchronized acquisition operations allow the upstream and downstream sensor units 2 and 3 to detect the upstream and downstream pressures at the same time.

Further, in the upstream sensor unit 2, the first CPU 26 acquires information related to the characteristics of the first resonant pressure sensor 22 from the first memory 24. In the downstream sensor unit 3, the second CPU 35 also acquires further information related to the characteristics of the second resonant pressure sensor 32 from the third memory 34. Then, the second CPU 35 transmits the further information to the first CPU 26 through the local data bus 4. Therefore, the first CPU 26 receives the further information from the second CPU 35.

The first CPU 26 calculates the upstream and downstream pressures from the first and second count values, respectively. The first CPU 26 further obtains the characteristics of the first and second resonant pressure sensors 22 and 32. The first CPU 26 corrects the calculated upstream and downstream pressures with reference to the characteristics of the first and second resonant pressure sensors 22 and 32. The first CPU 26 further calculates a differential pressure between the corrected upstream and downstream pressures, thereby generating a differential pressure signal that indicates the calculated differential pressure. As described above, the upstream and downstream pressures are the pressures of the upstream and downstream portions of the tube 100, wherein the upstream and downstream portions are positioned upstream and downstream of the orifice plate 200.

The first CPU 26 sends the differential pressure signal to the converter 27. The converter 27 converts the differential pressure signal into the converted differential pressure signal that is adaptive to the external device. The converted differential pressure signal is then transmitted to the external device through the signal transmission line 5.

The external device may be configured to store information about the liquid flowing through the tube 100. The information may include, but is not limited to, the density of the liquid in the tube 100. The external device may be configured to receive the converted differential pressure signal from the differential pressure measuring apparatus 1. The external device may be configured to calculate the flow rate of the liquid in the tube 100 with reference to both the converted differential pressure signal and the information about the liquid.

In accordance with the differential pressure measuring apparatus 1, the upstream sensor unit 2 as the first sensor unit is configured to detect directly the upstream pressure, while the downstream sensor unit 3 as the second sensor unit is configured to detect directly the downstream pressure. The upstream and downstream pressures are the pressures of the upstream and downstream portions of the tube 100, wherein the upstream and downstream portions are positioned upstream and downstream of the orifice plate 200. The differential pressure measuring apparatus 1 calculates the differential pressure between the upstream and downstream pressures.

The differential pressure measuring apparatus 1 does not utilize any connecting tubes which introduce the liquid into pressure sensors. Therefore, the differential pressure measuring apparatus 1 is free from the problem with the clogged liquid flow in the connecting tubes. The differential pressure measuring apparatus 1 is also free from the problem with the liquid leakage due to corrosion or failure of the connecting tubes.

The differential pressure measuring apparatus 1 does not utilize capillary tubes which introduce the liquid into pressure sensors. Therefore, the differential pressure measuring apparatus 1 is free from the problem with deterioration of the sensitivity due to an increased viscous resistance of the sealed liquid in the capillary tubes. Further, the differential pressure measuring apparatus 1 is free from the problem with deterioration of the measuring accuracy due to local volumetric variations of the liquid in the capillary tubes.

The differential pressure measuring apparatus 1 measures the differential pressure at a high accuracy and a high reliability.

As described above, the differential pressure measuring apparatus 1 is configured to render the upstream and downstream sensor units 2 and 3 perform synchronized operations to acquire the first and second count values that indicate the upstream and downstream pressures, respectively. These synchronized operations to acquire the first and second count values improve the accuracy in measuring the differential pressure. The reason of it will be described.

Figure 3:
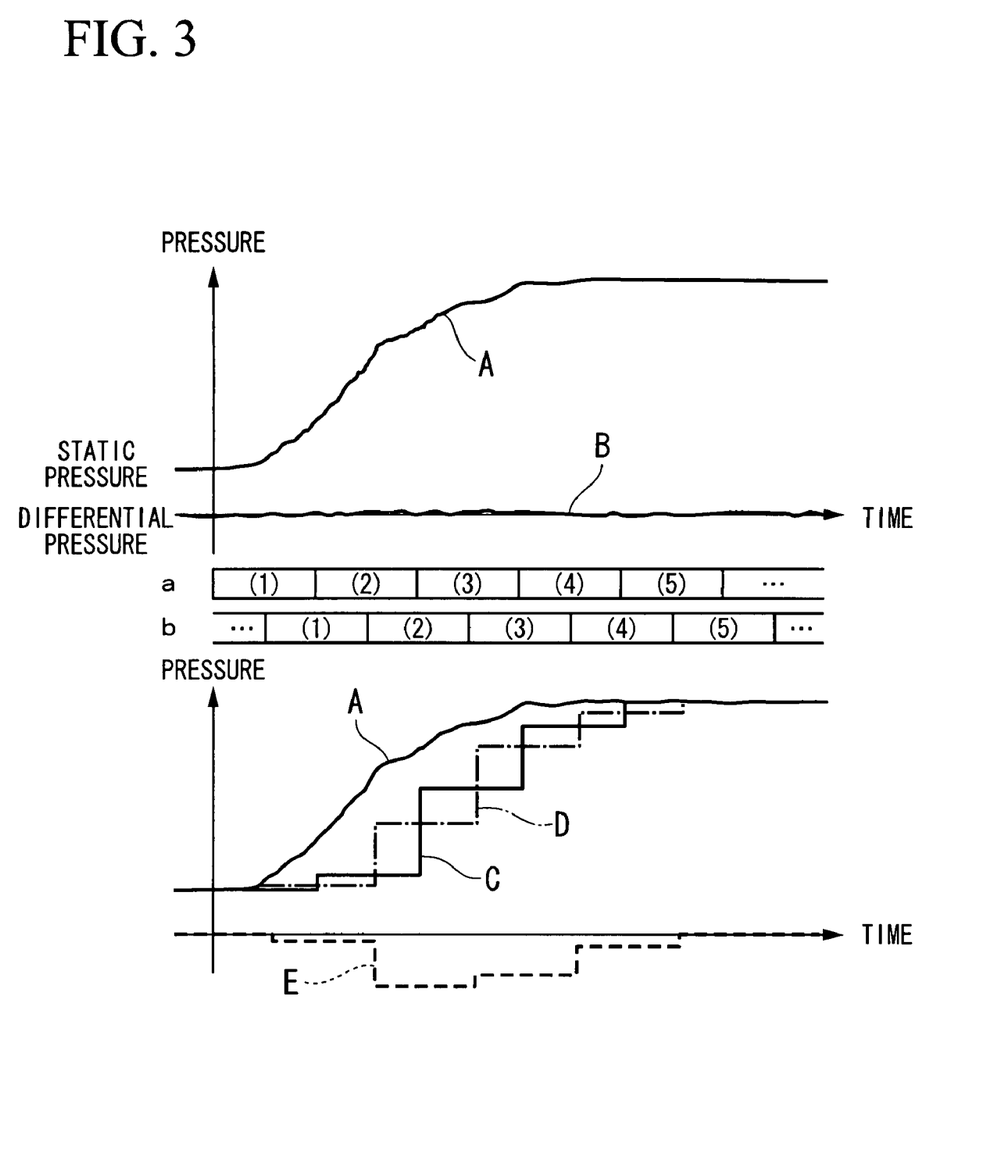
FIG. 3 is a diagram illustrating variations over time in pressure of a liquid in a tube in such a case that upstream and downstream sensor units in the differential pressure measuring apparatus of FIGS. 1 and 2 perform unsynchronized operations to acquire first and second count values.
Figure 4:
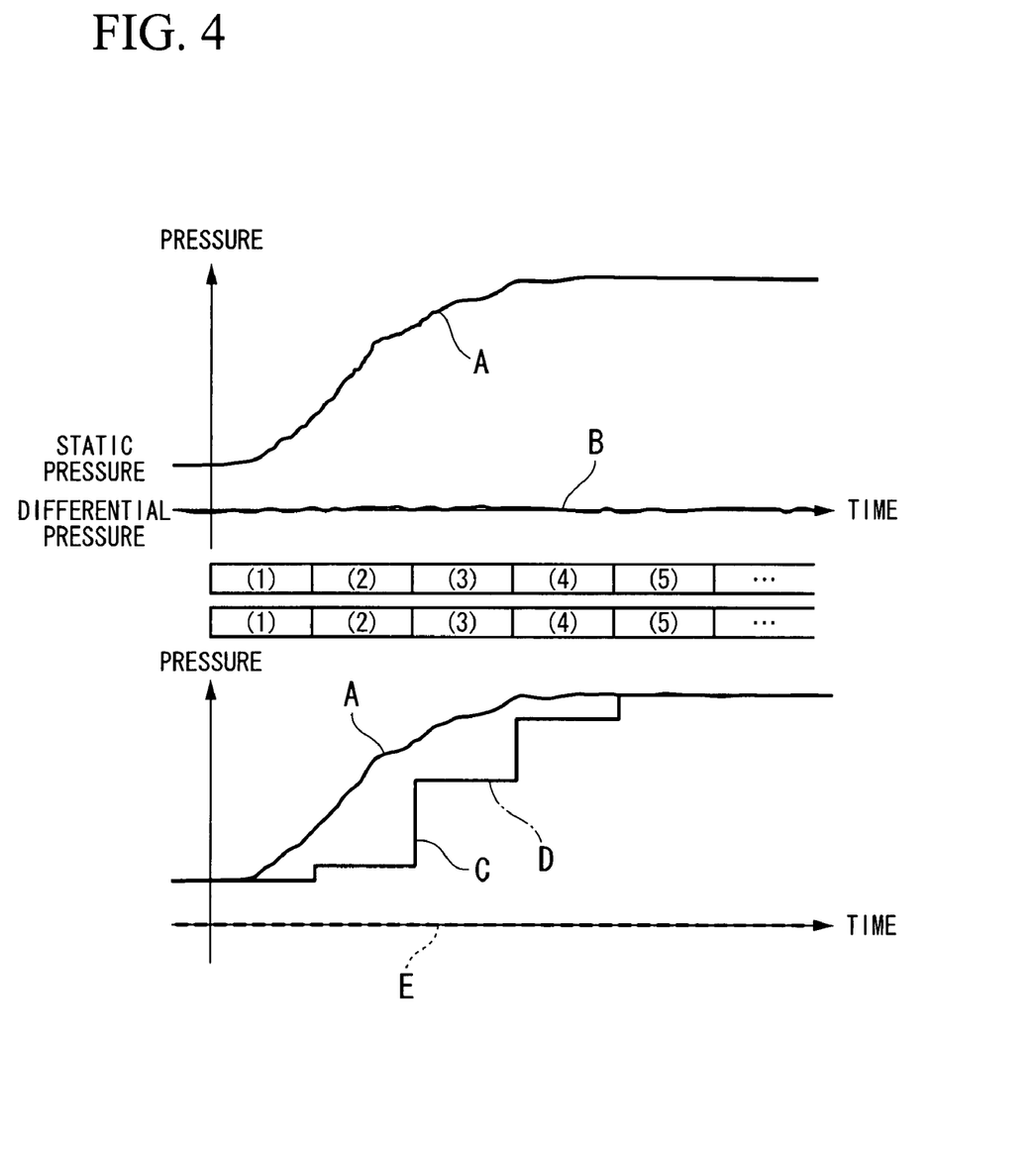
FIG. 4 is a diagram illustrating variations over time in pressure of a liquid in a tube in such a case that upstream and downstream sensor units in the differential pressure measuring apparatus of FIGS. 1 and 2 perform synchronized operations to acquire first and second count values.

FIG. 3 is a diagram illustrating variations over time in pressure of the liquid in the tube 100 in such a case that the upstream and downstream sensor units 2 and 3 perform unsynchronized operations to acquire the first and second count values. FIG. 4 is a diagram illustrating variations over time in pressure of the liquid in the tube 100 in such a case that the upstream and downstream sensor units 2 and 3 perform synchronized operations to acquire the first and second count values.

In FIGS. 3 and 4, a real line "A" represents the actual static pressure of the liquid in the tube 100. The actual static pressure is the pressure of the liquid that resides in but does not flow through the tube 100. Another real line "B" represents the actual differential pressure between the actual upstream and downstream pressures of the upstream and downstream portions of the tube 100. The upstream and downstream portions are positioned upstream and downstream of the orifice plate 200. Still another real line "C" represents a calculated upstream pressure of the upstream portion that is positioned upstream of the orifice plate 200. The calculated upstream pressure is calculated from the pressure that has been detected by the first resonant pressure sensor 22 in the upstream sensor unit 2. A dashed-and-dotted line "D" represents a calculated downstream pressure of the downstream portion that is positioned downstream of the orifice plate 200. The calculated downstream pressure is calculated from the pressure that has been detected by the second resonant pressure sensor 32 in the downstream sensor unit 3. A broken line "E" represents the calculated differential pressure between the calculated upstream and downstream pressures.

A first timing chart "a" represents timings when the first CPU 26 in the upstream sensor unit 2 acquires the first count value that has been counted by the first frequency counter 23. A second timing chart "b" represents timings when the second CPU 35 in the downstream sensor unit 3 acquires the second count value that has been counted by the second frequency counter 33.

As shown in FIG. 3, the actual static pressure "A" is simply increased, while the actual differential pressure "B" is constant. The timing when the first CPU 26 in the upstream sensor unit 2 acquires the first count value from the first frequency counter 23 is different from or unsynchronized with the timing when the second CPU 35 in the downstream sensor unit 3 acquires the second count value from the second frequency counter 33. Under these conditions, the timing of updating the calculated upstream pressure "C" is different from or unsynchronized with the timing of updating the calculated downstream pressure "D". Therefore, the calculated differential pressure "E" varies, while the actual differential pressure "B" is maintained constant.

As shown in FIG. 4, the actual static pressure "A" is simply increased, while the actual differential pressure "B" is constant. The timing when the first CPU 26 in the upstream sensor unit 2 acquires the first count value from the first frequency counter 23 is identical to or synchronized with the timing when the second CPU 35 in the downstream sensor unit 3 acquires the second count value from the second frequency counter 33. Under these conditions, the timing of updating the calculated upstream pressure "C" is identical to or synchronized with the timing of updating the calculated downstream pressure "D". Therefore, the calculated and actual differential pressures "E" and "B" are constant. This means that synchronized acquisition operations improves the accuracy of the calculated differential pressure.

The first and second CPUs 26 and 35 in the upstream and downstream sensor units 2 and 3 perform synchronized operations of acquiring the first and second count values from the first and second frequency counters 23 and 33. These synchronized acquisition operations improve the accuracy of the measured differential pressure.

The first CPU 26 in the upstream sensor unit 2 performs three operations of calculating the differential pressure, transmitting the synchronizing signal, and acquiring the result of detection by the first resonant pressure sensor 22. In other words, the first CPU 26 has three separate functions, for examples, a calculating function, a pressure-detecting function and a synchronizing function. These three functions are performed by a single multifunction unit, for example, the first CPU 26. It is unnecessary to provide three discrete parts or components for performing the three separate functions. This configuration may contribute to scaling down and cost-reduction of the differential pressure measuring apparatus 1.

In accordance with the above-described embodiment, the first CPU 26 in the upstream sensor unit 2 generates the synchronizing signal that allows the first and second CPUs 26 and 35 to perform synchronized operations of acquiring the first and second count values.

It is possible as a modification to provide first and second timers for the first and second CPUs 26 and 35 in the upstream and downstream sensor units 2 and 3. The first and second timers are used to allow the first and second CPUs 26 and 35 to perform synchronized operations of acquiring the first and second count values.

Second Embodiment

Figure 5:
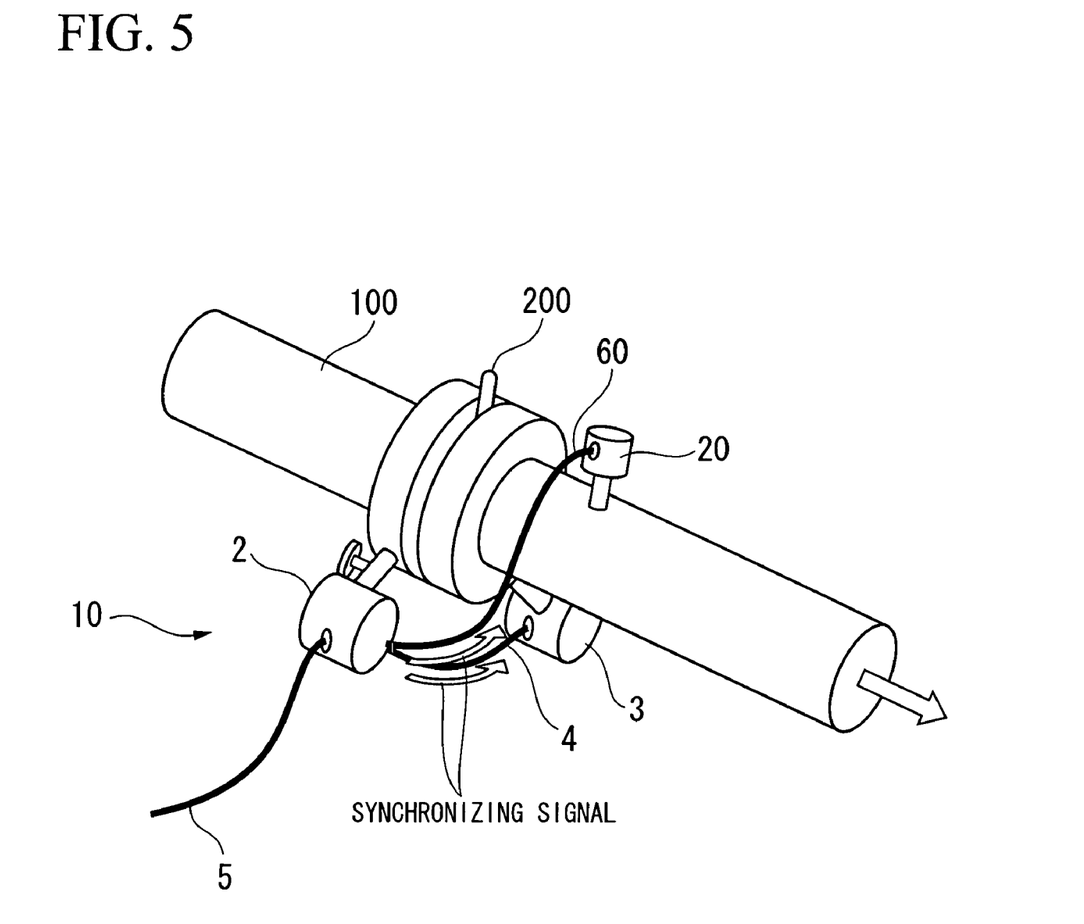
FIG. 5 is a schematic perspective view illustrating a differential pressure measuring apparatus in accordance with the second embodiment of the present invention.
Figure 6:
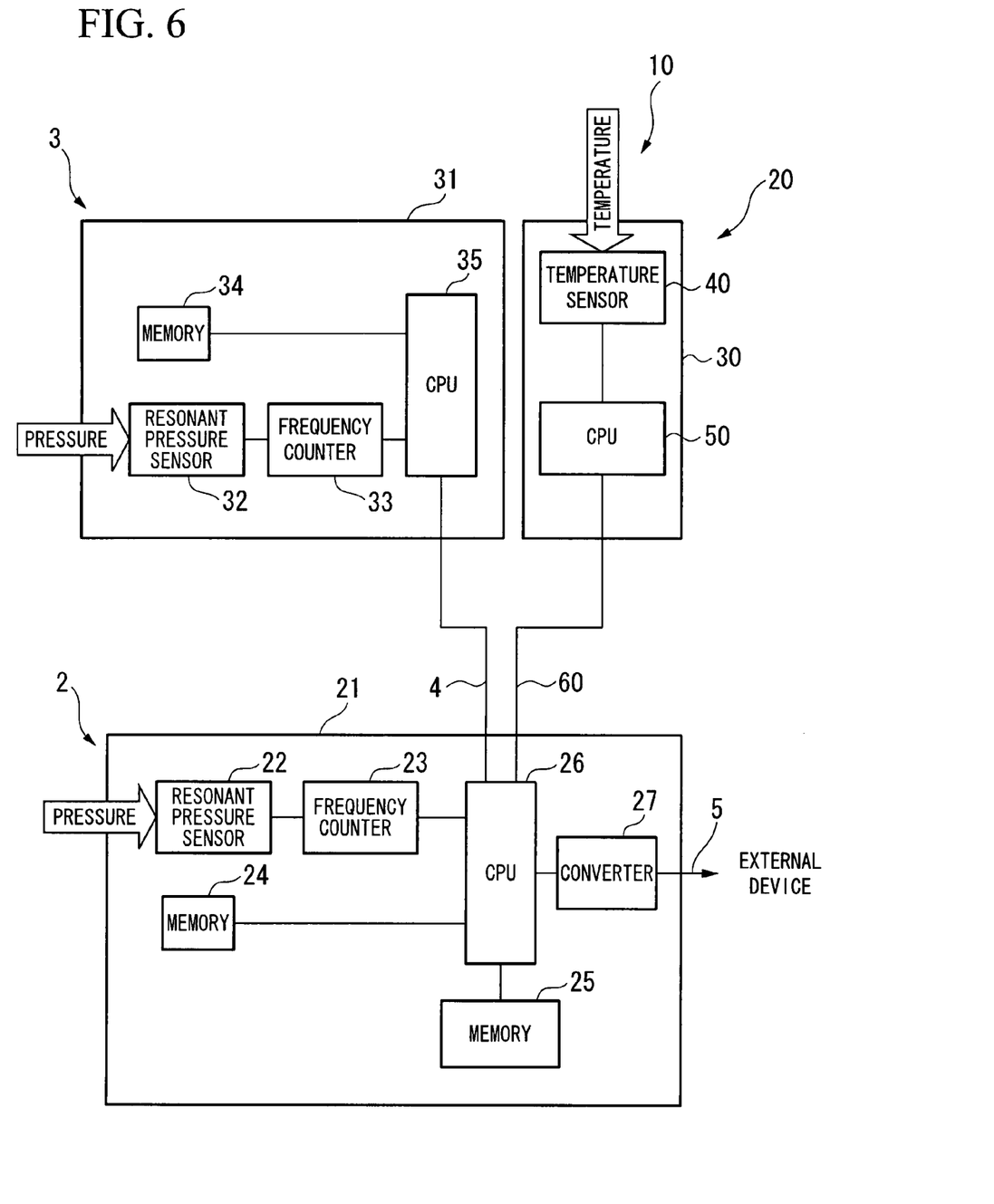
FIG. 6 is a block diagram illustrating functional blocks of the differential pressure measuring apparatus of FIG. 5.

A second embodiment of the present invention will be described. FIG. 5 is a schematic perspective view illustrating a differential pressure measuring apparatus in accordance with the second embodiment of the present invention. FIG. 6 is a block diagram illustrating functional blocks of the differential pressure measuring apparatus of FIG. 5.

As shown in FIG. 5, a differential pressure measuring apparatus 10 may be used to measure a differential pressure between different portions, areas or sites of the tube 100 with the orifice plate 200. The differential pressure measuring apparatus 10 may include, but is not limited to, the upstream and downstream sensor units 2 and 3 and a temperature sensor unit 20. The upstream and downstream sensor units 2 and 3 of this embodiment are the same as described in the first embodiment. The upstream and downstream sensor units 2 and 3 may be coupled to the tube 100 on the opposite sides of the orifice plate 200. The upstream and downstream sensor units 2 and 3 may be configured to be communicated with the upstream and downstream portions of the tube 100. The upstream and downstream sensor units 2 and 3 may be configured to detect directly the upstream and downstream pressures of the upstream and downstream portions of the tube 100.

The temperature sensor unit 20 may be coupled to the downstream portion of the tube 100. The temperature sensor unit 20 may be configured to detect directly the temperature of a liquid in the downstream portion of the tube 100.

The upstream sensor unit 2 may be configured to be electrically connected to the external device through the signal transmission line 5. The downstream sensor unit 3 may also be configured to be electrically connected to the upstream sensor unit 2 through the local data bus 4. The temperature sensor unit 20 may be configured to be electrically connected to the upstream sensor unit 2 through a local data bus 60.

As shown in FIG. 6, the upstream sensor unit 2 may include, but is not limited to, the first enclosure 21, the first resonant pressure sensor 22, the first frequency counter 23, the first memory 24, the second memory 25, the first CPU 26, and the converter 27. The configurations of the upstream sensor unit 2 of this embodiment are the same as those of the first embodiment.

The downstream sensor unit 3 may include, but is not limited to, the second enclosure 31, the second resonant pressure sensor 32, the second frequency counter 33, the third memory 34, and the second CPU 35. The configurations of the downstream sensor unit 3 of this embodiment are the same as those of the first embodiment.

The temperature sensor unit 20 may include, but is not limited to, a third enclosure 30, a temperature sensor 40 and a third CPU 50.

The third enclosure 30 may be configured to contain the temperature sensor 40 and the third CPU 50. The shape of the third enclosure 21 is optional, but may typically be a cylinder in general.

The temperature sensor 40 may be configured to detect directly the temperature of a liquid in the downstream portion of the tube 100, and generate a temperature detection signal that indicates the detected temperature. The temperature sensor 40 may be realized by, but not limited to, a known temperature sensor.

The third CPU 50 may be configured to be electrically connected to the temperature sensor 40 so that the third CPU 50 receives the temperature detection signal from the temperature sensor 40. The third CPU 50 may be configured to be electrically connected to the first CPU 26 in the upstream sensor unit 2 through the local data bus 60. The first CPU 26 transmits the synchronizing signal to the second and third CPUs 35 and 50 through the local data buses 4 and 60. Upon receipt of the synchronizing signal from the first CPU 26, the third CPU 50 acquires the temperature detection signal from the temperature sensor 40 and transmits the temperature detection signal to the first CPU 26 through the local data bus 60.

The first CPU 26 in the upstream sensor unit 2 transmits the synchronizing signal to the second and third CPUs 35 and 50 through the local data buses 4 and 60 at the output timing that has been stored in the second memory 25.

The second CPU 35 in the downstream sensor unit 3 receives the synchronizing signal from the first CPU 26. The third CPU 50 in the temperature sensor unit 20 receives the synchronizing signal from the first CPU 26. Upon receipt of the synchronizing signal, the second CPU 35 acquires the second count value from the second frequency counter 33 and then transmits the second count value to the first CPU 26 through the local data bus 4. Upon receipt of the synchronizing signal, the third CPU 50 acquires the temperature detection signal from the temperature sensor 40 and then transmits the temperature detection signal to the first CPU 26 through the local data bus 60.

The first CPU 26 acquires the first count value from the first frequency counter 23 while the first CPU 26 receives the second count value from the second CPU 35 and the temperature detection signal from the third CPU 50. In other words, the first CPU 26 acquires the first count value from the from the first frequency counter 23 after a time period has elapsed from when transmitting the synchronizing signal to the second and third CPUs 35 and 50 through the local data buses 4 and 60. The time period is defined between first and second timings. At the first timing, the first CPU 26 transmits the synchronizing signal to the second and third CPUs 35 and 50 through the local data buses 4 and 60. At the second timing, the first and second CPUs 35 acquire the first and second count values from the first and second frequency counters 23 and 33, and also the third CPU 50 acquires the temperature detection signal from the temperature sensor 40.

This means that the upstream and downstream pressures and the temperature of the liquid in the tube 100 at the same time are synchronously detected by the upstream and downstream sensor units 2 and 3 and the temperature sensor unit 20, respectively. The synchronous operations allow the first CPU 26 to calculate the accurate differential pressure between the upstream and downstream portions of the tube 100. The synchronous operations further allow the first CPU 26 to calculate the accurate flow rate of the liquid in the tube 100 with reference to the calculated differential pressure, the detected temperature and the dependency of the liquid density upon temperature.

As used herein, the following directional terms "upstream and downstream" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, section or part of a device includes hardware and/or software that is constructed and/or programmed to carry out the desired function.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An apparatus for measuring differential pressure, the apparatus comprising:
   a first sensor unit configured to detect directly a first pressure of a substance at a first position, the first sensor unit being configured to acquire a first detection result that indicates the first pressure; and
   a second sensor unit configured to detect directly a second pressure of the substance at a second position, the second position being different from the first position, the second sensor unit being configured to acquire a second detection result that indicates the second pressure, the second sensor unit being configured to receive the first detection result from the first sensor unit, the second sensor unit being configured to calculate a differential pressure between the first and second positions with reference to the first and second detection results, wherein the first and second sensor units are operatively coupled to each other to acquire the first and second detection results synchronously with each other, and wherein the second sensor unit is configured to generate a synchronizing signal and transmit the synchronizing signal to the first sensor unit, the first and second sensor units acquire the first and second detection results synchronously with each other based on the synchronizing signal.

2. An apparatus for measuring differential pressure, the apparatus comprising:

a first sensor unit configured to detect directly a first pressure of a substance at a first position, the first sensor unit being configured to acquire a first detection result that indicates the first pressure; and a second sensor unit configured to detect directly a second pressure of the substance at a second position, the second position being different from the first position, the second sensor unit being configured to acquire a second detection result that indicates the second pressure, the second sensor unit being configured to receive the first detection result from the first sensor unit, the second sensor unit being configured to calculate a differential pressure between the first and second positions with reference to the first and second detection results, wherein the first and second sensor units are operatively coupled to each other to acquire the first and second detection results synchronously with each other, and wherein the first and second sensor units respectively include first and second timers that operate synchronously with each other and allow the first and second sensor units to acquire the first and second detection results synchronously with each other.

3. An apparatus for measuring differential pressure, the apparatus comprising:

a first sensor unit configured to detect directly a first pressure of a substance at a first position, the first sensor unit being configured to acquire a first detection result that indicates the first pressure;

a second sensor unit configured to detect directly a second pressure of the substance at a second position, the second position being different from the first position, the second sensor unit being configured to acquire a second detection result that indicates the second pressure, the second sensor unit being configured to receive the first detection result from the first sensor unit, the second sensor unit being configured to calculate a differential pressure between the first and second positions with reference to the first and second detection results; and a temperature sensor unit configured to detect the temperature of the substance at least one of the first and second positions, the temperature sensor unit being configured to acquire a third detection result that indicates the temperature, the temperature sensor unit being configured to transmit the third detection result to the second sensor unit, the temperature sensor unit being operatively coupled to the first and second sensor units to allow the first and second sensor units and the temperature sensor unit to acquire the first, second and third detection results synchronously with each other, wherein the first and second sensor units are operatively coupled to each other to acquire the first and second detection results synchronously with each other.

4. The apparatus according to claim 1, wherein the first sensor unit comprises:

a first pressure sensor configured to detect the first pressure; and a first detection result acquiring unit configured to acquire the first detection result, and wherein the second sensor unit comprises:

a second pressure sensor configured to detect the second pressure;

a second detection result acquiring unit configured to acquire the second detection result; and a calculation unit configured to receive the first and second detection results from the first and second detection result acquiring units, the calculation unit being configured to calculate the differential pressure.

5. The apparatus according to claim 2, wherein the first sensor unit comprises:

a first pressure sensor configured to detect the first pressure; and a first detection result acquiring unit configured to acquire the first detection result, and wherein the second sensor unit comprises:

a second pressure sensor configured to detect the second pressure;

a second detection result acquiring unit configured to acquire the second detection result; and a calculation unit configured to receive the first and second detection results from the first and second detection result acquiring units, the calculation unit being configured to calculate the differential pressure.

6. An apparatus for measuring differential pressure, the apparatus comprising:

a first sensor unit configured to detect directly a first pressure of a substance at a first position, the first sensor unit being configured to acquire a first detection result that indicates the first pressure;

a second sensor unit configured to detect directly a second pressure of the substance at a second position, the second position being different from the first position, the second sensor unit being configured to acquire a second detection result that indicates the second pressure, the second sensor unit being configured to receive the first detection result from the first sensor unit, the second sensor unit being configured to calculate a differential pressure between the first and second positions with reference to the first and second detection results;

a temperature sensor configured to detect the temperature of the substance at least one of the first and second positions, the temperature sensor being configured to acquire a third detection result that indicates the temperature; and a temperature detection result acquiring unit configured to acquire the third detection result, the temperature detection result acquiring unit being configured to transmit the third detection result to the calculation unit, the temperature detection result acquiring unit being operatively coupled to the first and second detection result acquiring units to allow the first and second detection result acquiring units and the temperature detection result acquiring unit to acquire the first, second and third detection results synchronously with each other, wherein the first sensor unit comprises:

a first pressure sensor configured to detect the first pressure; and a first detection result acquiring unit configured to acquire the first detection result, and wherein the second sensor unit comprises:

a second pressure sensor configured to detect the second pressure;

a second detection result acquiring unit configured to acquire the second detection result; and a calculation unit configured to receive the first and second detection results from the first and second detection result acquiring units, the calculation unit being configured to calculate the differential pressure.

7. The apparatus according to claim 1, wherein the substance is a liquid.

8. An apparatus for measuring differential pressure, the apparatus comprising:

a first sensor unit configured to detect directly a first pressure of a substance at a first position, the first sensor unit being configured to acquire a first detection result that indicates the first pressure;

a second sensor unit configured to detect directly a second pressure of the substance at a second position, the second position being different from the first position, the second sensor unit being configured to acquire a second detection result that indicates the second pressure; and a calculation unit configured to receive the first detection result from the first sensor unit, the calculation unit being configured to calculate a differential pressure between the first and second positions with reference to the first and second detection results, wherein the first and second sensor units are operatively coupled to each other to acquire the first and second detection results synchronously with each other, and wherein the second sensor unit is configured to generate a synchronizing signal and transmit the synchronizing signal to the first sensor unit, the first and second sensor units acquire the first and second detection results synchronously with each other based on the synchronizing signal.

9. The apparatus according to claim 1, further comprising a temperature sensor unit configured to detect the temperature of the substance at least one of the first and second positions, the temperature sensor unit being configured to acquire a third detection result that indicates the temperature, the temperature sensor unit being configured to transmit the third detection result to the second sensor unit, the temperature sensor unit being operatively coupled to the first and second sensor units to allow the first and second sensor units and the temperature sensor unit to acquire the first, second and third detection results synchronously with each other.

10. The apparatus according to claim 4, further comprising: a temperature sensor configured to detect the temperature of the substance at least one of the first and second positions, the temperature sensor being configured to acquire a third detection result that indicates the temperature; and a temperature detection result acquiring unit configured to acquire the third detection result, the temperature detection result acquiring unit being configured to transmit the third detection result to the calculation unit, the temperature detection result acquiring unit being operatively coupled to the first and second detection result acquiring units to allow the first and second detection result acquiring units and the temperature detection result acquiring unit to acquire the first, second and third detection results synchronously with each other.

* * * * *